US006572958B1

(12) United States Patent
Chour et al.

(10) Patent No.: US 6,572,958 B1
(45) Date of Patent: Jun. 3, 2003

(54) MAGNETIC RECORDING MEDIA COMPRISING A SILICON CARBIDE CORROSION BARRIER LAYER AND A C-OVERCOAT

(75) Inventors: Kueir-Weei Chour, San Jose, CA (US); Liji Huang, San Jose, CA (US); Jie-Ming Yu, Pleasanton, CA (US); Kuo-Hsing Hwang, San Jose, CA (US); Chung Shih, Cupertino, CA (US); Lin Huang, San Jose, CA (US); Charles Leu, Fremont, CA (US); Qixu Chen, Milpitas, CA (US); Rajiv Yadav Ranjan, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 36 days.

(21) Appl. No.: 09/621,530

(22) Filed: Jul. 21, 2000

Related U.S. Application Data
(60) Provisional application No. 60/148,123, filed on Aug. 10, 1999, and provisional application No. 60/145,360, filed on Jul. 22, 1999.

(51) Int. Cl.[7] .................................................. G11B 5/72
(52) U.S. Cl. ................. 428/213; 428/336; 428/694 TP; 428/694 TC; 428/698; 204/192.5; 204/192.6; 427/131; 427/249.15
(58) Field of Search ................................. 428/213, 336, 428/694 TP, 694 TC, 698; 204/192.15, 192.16; 427/131, 249.15

(56) References Cited

U.S. PATENT DOCUMENTS 4,647,494 A * 3/1987 Meyerson et al.
4,774,130 A * 9/1988 Endo et al. ................. 428/216
4,839,244 A   6/1989 Tsukamoto
4,840,844 A * 6/1989 Futamoto et al. ........... 428/336
5,190,823 A * 3/1993 Anthony et al.
5,192,618 A * 3/1993 Frankel et al. .............. 428/457
5,227,211 A   7/1993 Eltoukhy et al.

(List continued on next page.)

OTHER PUBLICATIONS

"Structure of Nitrogenated Carbon Overcoats on Thin Film Hard Disks," by Huang et al., IEEE Transactions on Magnetics, pp. 1–8.

"Characterization of the Head–Disk Interface for Proximity Recording," by Huang et al., IEEE Transactions on Magnetics (Sep. 1997).

(List continued on next page.)

Primary Examiner—Steven A. Resan
(74) Attorney, Agent, or Firm—McDermott, Will & Emery

(57) ABSTRACT

A magnetic recording medium is provided with a dual layer protective overcoat system comprising a SiC corrosion barrier layer and a carbon-containing protective overcoat thereon. The SiC layer effectively prevents or significantly reduces Co and Ni diffusion to the medium surface. Embodiments include magnetic recording media comprising a SiC corrosion barrier layer over a magnetic layer, an overlying protective layer of amorphous hydrogenated carbon, amorphous nitrogenated carbon or amorphous hydrogen-nitrogenated carbon, and a lubricant topcoat thereon. Embodiments of the present invention further include magnetic recording media comprising Ni—P plated aluminum, Ni-plated glass or non-conductive substrates including glass, glass-ceramic and ceramic materials. Embodiments of the present invention further include a dual protective overcoat system having a combined thickness less than about 100 Å, such as less than about 75 Å, e.g., less than about 50 Å, with the SiC corrosion barrier layer having a thickness ranging from 1 Å to 40 Å.

20 Claims, 4 Drawing Sheets

U.S. PATENT DOCUMENTS

| | | |
|---|---|---|
| 5,567,512 A | 10/1996 | Chen et al. |
| 5,589,263 A | 12/1996 | Ueda et al. |
| 5,607,783 A | 3/1997 | Onodera |
| 5,637,393 A | 6/1997 | Ueda et al. |
| 5,707,742 A | 1/1998 | Usuki et al. |
| 5,714,044 A | 2/1998 | Lal et al. |
| 5,780,135 A * | 7/1998 | Kikitsu et al. ............. 428/65.3 |
| 5,785,825 A | 7/1998 | Hwang et al. |
| 5,837,357 A | 11/1998 | Matsuo et al. |
| 5,855,746 A | 1/1999 | Prabhakara et al. |
| 5,942,317 A | 8/1999 | White |
| 5,958,542 A | 9/1999 | Ootake et al. |
| 5,968,679 A | 10/1999 | Kobayashi et al. |

OTHER PUBLICATIONS

"Characterization of Diamondlike Carbon Films and their Application as Overcoats on Thin–Film Media for Magnetic Recording," by Tsai et al., J. Vac. Sci. Technol. A, vol. 5, No. 6, (Nov./Dec. 1987), pp. 3267–3312.

* cited by examiner

MAGNETIC RECORDING MEDIA COMPRISING A SILICON CARBIDE CORROSION BARRIER LAYER AND A C-OVERCOAT

RELATED APPLICATIONS

This application claims priority from provisional patent application Serial No. 60/145,360 filed Jul. 22, 1999, entitled "SIC AS CORROSION-BARRIER LAYER ON GLASS FOR MAGNETIC DATA STORAGE DISKS APPLICATION," the entire disclosure of which is hereby incorporated by reference herein.

This application also claims priority from provisional patent application Serial No. 60/148,123 filed Aug. 10, 1999, entitled "THIN SIC LAYER PROVIDING NITROGEN CAPPING PROPERTIES FOR MAGNETIC MEDIUM," the entire disclosure of which is hereby incorporated by reference herein.

TECHNICAL FIELD

The present invention relates to magnetic recording media, particularly rotatable magnetoresistance (MR) or giant magnetoresistance (GMR) recording media, such as thin film magnetic disks cooperating with a magnetic transducer head. The present invention has particular applicability to high areal density magnetic recording media designed for drive programs having reduced flying height, or pseudo-contact/proximity recording.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For media with a maximum recording areal density, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too smooth, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

Conventional longitudinal recording media typically comprise a substrate, such as aluminum (Al) or an Al alloy, e.g., aluminum-magnesium (Al—Mg) alloy, plated with a layer of amorphous nickel-phosphorus (NiP). Alternative substrates include glass, ceramic, glass-ceramic, and polymeric material and graphite. The substrate typically contains sequentially deposited on each side thereof at least one underlayer, such as chromium (Cr) or a Cr-alloy, e.g., chromium vanadium (CrV), a cobalt (Co)-based alloy magnetic layer, a protective overcoat typically containing carbon, and a lubricant. The underlayer, magnetic layer and protective overcoat, are typically sputter deposited in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective overcoat to prevent wear between the disk and head interface during drive operation. Excessive wear of the protective overcoat increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

A conventional material employed for the lubricant topcoat comprises a perfluoro polyether (PFPE) which consists essentially of carbon, fluorine and oxygen atoms. The lubricant is typically dissolved in an organic solvent, applied and bonded to the carbon overcoat of the magnetic recording medium by techniques such as dipping, buffing, thermal treatment, ultraviolet (UV) irradiation and soaking.

The escalating requirements for high areal recording density impose increasingly greater requirements on thin film magnetic recording media in terms of coercivity, stiction, squareness, medium noise and narrow track recording performance. In addition, increasingly high areal recording density and large-capacity magnetic disks require smaller flying heights, i.e., the distance by which the head floats above the surface of the disk in the drive (head-disk spacing). For conventional media design, a decrease in the head to media spacing increases stiction and drive crash, thereby imposing an indispensable role on the carbon-protective overcoat.

There are various types of carbon, some of which have been employed for a protective overcoat in manufacturing a magnetic recording medium. Such types of carbon include hydrogenated carbon, graphitic carbon or graphite, and nitrogenated carbon or carbon nitride and hydrogen-nitrogenated carbon. These types of carbon are well known in the art and, hence, not set forth herein in great detail.

Generally, hydrogenated carbon or amorphous hydrogenated carbon has a hydrogen concentration of about 5 at. % to about 40 at. %, typically about 20 at. % to about 30 at. %. Hydrogenated carbon has a lower conductivity due to the elimination of the carbon band-gap states by hydrogen. Hydrogenated carbon also provides effective corrosion protection to an underlying magnetic layer. Amorphous carbon nitride, sometimes referred to as nitrogenated carbon, generally has a nitrogen to hydrogen concentration ratio of about 2:30 to about 30:0. Hydrogen-nitrogenated carbon generally has a hydrogen to nitrogen concentration ratio of about 30:2 to 20:10 (higher concentration of hydrogen than nitrogen). Amorphous (a) hydrogen-nitrogenated carbon can be represented by the formula a-$CH_xN_y$, wherein "x" is about 0.05 (5.0 at. %) to about 0.30 (30 at. %), such as about 0.1 (10 at. %) to about 0.2 (20 at. %), and "y" about 0.01 (1.0 at. %) to about 0.30 (30 at. %), such as about 0.03 (3.0 at. %) to about 0.07 (7.0 at. %). A particularly suitable composition is a-$CH_{15}N_{05}$. Graphitic carbon or graphite contains substantially no hydrogen and nitrogen.

The drive for high areal recording density and, consequently, reduced flying heights, challenges the capabilities of conventional manufacturing practices. For example, a suitable protective overcoat must be capable of preventing corrosion of the underlying magnetic layer, which is an electrochemical phenomenon dependent upon factors such as environmental conditions, e.g., humidity and temperature. In addition, a suitable protective overcoat must prevent migration of ions, such as cobalt (Co) and nickel (Ni), from underlying layers into the lubricant topcoat and to the surface of the magnetic recording medium forming defects such as asperities. A protective overcoat must also exhibit the requisite surface for wear resistance, lower stiction, and some polarity to enable bonding thereto of a lubricant topcoat in an adequate thickness.

Furthermore, as the head disk interface decreases to less than about 1 μinch, it is necessary to reduce the thickness of carbon-containing protective overcoat to be below about 100 Å, e.g., below about 75 Å, in order to improve the performance of the magnetic recording and reduce the spacing loss between the read/write head and magnetic recording medium surface. However, when the thickness of the carbon-containing protective overcoat is reduced to below about 100 Å, e.g., below about 75 Å, corrosion becomes a significant issue and head crash is encountered because the protective overcoat exhibits very poor tribological properties and low reliability. Most GMR and MR media overcoats comprise a single layer of carbon material, such as amorphous hydrogenated carbon or amorphous nitrogenated carbon, and exhibit adequate reliability at a thickness of about 125 Å to about 250 Å. However, as the thickness of the carbon-containing overcoat is reduced to below about 100 Å, e.g., below about 75 Å, head crash occurs, presumably because of lower wear resistance and the discontinuities formed in the sputter deposited layer. In addition, corrosion becomes a significant factor in that Co and Ni diffuse through the thin protective overcoat to the medium surface.

Kobayashi et al. in U.S. Pat. No. 5,968,679 disclose a magnetic recording medium comprising a dual protective system including a first protection film comprising chromium, silicon oxide, carbon, zirconia, carbon hydride, silicon nitride or silicon carbide, at a thickness of 50 Å, and a second protective film of silicon oxide or carbon deposited at a thickness of about 160 Å. Ootake et al. in U.S. Pat. No. 5,958,542 disclose a magnetic recording medium comprising a protective layer which can include silicon dioxide, titanium dioxide, zirconium dioxide, carbon or silicon carbide with scattered bumps thereon formed of carbon, silicon carbide or silicon dioxide. Usuki et al. in U.S. Pat. No. 5,707,742 disclose a magnetic recording medium comprising a protective film which can include any of various materials, inclusive of silicon carbide. Tsukamoto in U.S. Pat. No. 4,839,244 discloses a magnetic recording medium comprising a protective overcoat system including an interlayer which can include silicon carbide and a layer of graphite fluoride thereon.

In copending U.S. patent application Ser. No. 09/477,064 filed on Jan. 4, 2000, a method is disclosed for manufacturing a magnetic recording medium comprising dual carbon-containing protective layers, wherein the first protective layer is sputter deposited while applying a direct current bias to the substrate, resulting in a highly dense first protective layer at a reduced thickness. Such a technique involving the application of a direct current bias to the substrate are not readily adaptable to non-conductive substrates, such as glass, glass-ceramic or ceramic materials.

There exists a continuing need for magnetic recording media comprising a protective overcoat system capable of satisfying the imposing demands for high areal recording density, corrosion resistance and reduced head-disk interface. There also exists a particular need for an MR or a GMR magnetic recording medium having a protective overcoat with a thickness of less than about 100 Å exhibiting excellent tribological properties at very low glide heights, resistance to corrosion and long term durability.

DISCLOSURE OF THE INVENTION

An advantage of the present invention is a magnetic recording medium comprising a protective overcoat system exhibiting excellent tribological properties at very low glide heights, superior corrosion resistance and long term durability.

Another advantage of the present invention is a magnetic recording medium comprising a protective overcoat having a thickness less than about 100 Å exhibiting excellent tribological properties at very low glide heights, superior corrosion resistance and long term durability.

A further advantage of the present invention is a method of manufacturing a magnetic recording medium with excellent tribological properties at very low glide heights, superior corrosion resistance and long term durability.

Additional advantages and other features of the present invention will be set forth in part in the description which follows and in part will become apparent to those having ordinary skill in the art upon examination of the following disclosure or may be learned from the practice of the present invention. The advantages of the present invention may be realized and obtained as particularly pointed out in the appended claims.

According to the present invention, the foregoing and other advantages are achieved in part by a magnetic recording medium comprising: a non-magnetic substrate; a magnetic layer over the substrate; a corrosion barrier layer of silicon carbide (SiC) over the magnetic layer; and a protective carbon-containing overcoat on the SiC layer.

Another aspect of the present invention is a method of manufacturing a magnetic recording medium, the method comprising: depositing a magnetic layer over a non-magnetic substrate; sputter depositing a corrosion barrier layer of SiC over the magnetic layer; and sputter depositing a protective carbon-containing overcoat on the SiC layer.

Embodiments of the present invention comprise a magnetic recording medium containing a magnetic layer and means to protect the magnetic layer, the means comprising a dual protective overcoat system containing a corrosion barrier layer of SiC and a protective carbon-containing overcoat thereon. Embodiments of the present invention includes depositing the SiC corrosion barrier layer by D.C. magnetron sputtering and depositing the protective carbon-containing overcoat by A.C. or R.F. sputtering. Embodiments of the present invention further comprise magnetic recording media having a SiC corrosion barrier layer and protective-carbon-containing overcoat with a combined thickness less than about 100 Å, such as less than about 75 Å, e.g., less than about 50 Å. Embodiments of the present invention include magnetic recording media with a SiC corrosion barrier layer having a thickness of about 1 Å to about 40 Å, e.g., about 1 Å to about 12 Å, and a thickness of about 10 Å to about 40 Å, particularly for use with a glass substrate. Embodiments of the present invention include magnetic recording media wherein the SiC barrier layer has a thickness of about 20% to about 40% of the combined thickness of the corrosion barrier layer and protective carbon-containing overcoat, and the carbon-containing protective overcoat as a thickness of about 60% to about 80% of the combined thickness.

Additional advantages of the present invention will become readily apparent to those having ordinary skill in the art from the following detailed description, wherein the embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DESCRIPTION OF THE INVENTION

Figure 1:
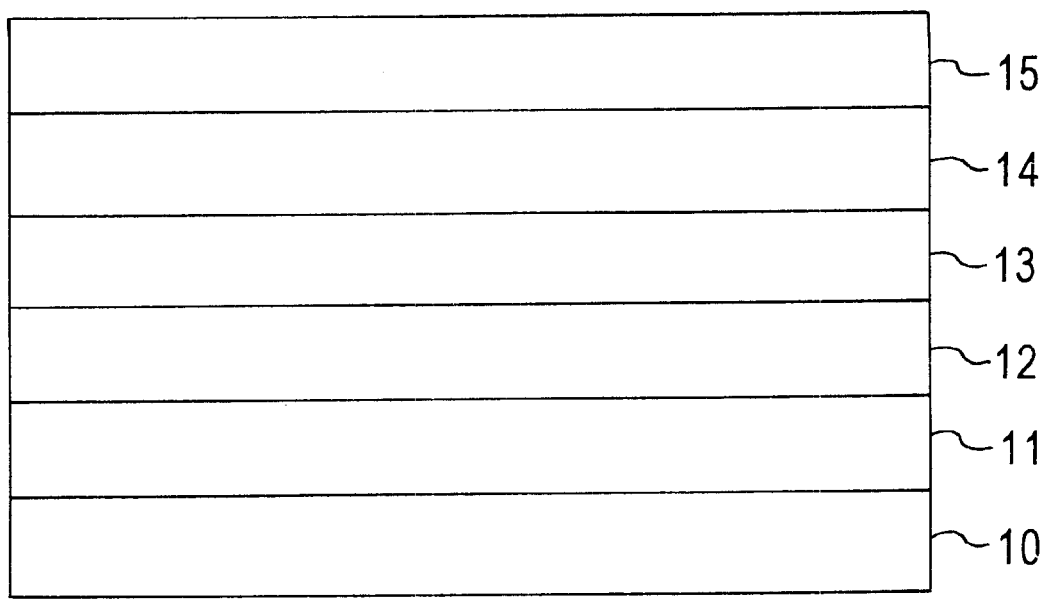
FIG. 1 schematically illustrates a magnetic recording medium in accordance with an embodiment of the present invention.

The present invention enables the manufacture of magnetic recording media containing a dual protective overcoat system, comprising a SiC corrosion barrier layer and a protective carbon overcoat, having a total thickness less than about 100 Å, such as less than about 75 Å, e.g., less than about 50 Å, which media exhibit superior corrosion resistance, excellent tribological properties at a very low glide height, e.g., below about 1 $\mu$inch, and long term durability. Embodiments of the present invention, therefore, enable the manufacture of MR and GMR magnetic recording media with good corrosion resistance, improved magnetic recording performance and reduced spacing loss between the read/write head and magnetic recording surface by reducing the total overcoat thickness to even less than 75 Å, e.g., less than about 50 Å.

The SiC corrosion barrier layer in accordance with embodiments of the present invention serves as a corrosion barrier layer preventing or significantly reducing corrosion by preventing or significantly reducing Co and Ni migration to the medium surface, and further serves as a foundation layer for the subsequently deposited protective carbon layer. The SiC corrosion barrier layer can be deposited as a thickness of about 1 Å to about 40 Å. A protective carbon-containing layer is then deposited on the SiC corrosion barrier layer. The protective carbon-containing layer can comprise any of various diamond-like carbon (DLC) overcoats, such as amorphous hydrogenated carbon (a-C:H), amorphous nitrogenated carbon (a-C:N) or amorphous hydrogenated-nitrogenated carbon. The protective carbon layer can be deposited at a thickness of about 10 Å to about 60 Å.

Embodiments of the present invention comprise magnetic recording media with a lubricant topcoat on the carbon-containing protective layer, such as a perfluoropolyether lubricant, e.g., Z-DOL®, Z-TETRAOL® or AM3001®, to enhance tribology and durability of the head-disk interface. Magnetic recording media in accordance with the present invention can comprise any conventional substrate, such as NiP/Al or an NiP/Al alloy substrate, or a glass, ceramic, glass-ceramic or polymeric substrate.

Advantageously, the dual layer protective overcoat system of the present invention provides enhanced durability and effectively prevents corrosion of the underlying magnetic layer and prevents migration of ions from underlying layers. The exact operative mechanism enabling the formation of a uniform, continuous protective overcoat, at a thickness of less than about 1 Å, such as less than about 100 Å, such as less than about 75 Å, e.g., less than 50 Å, while providing good corrosion resistance and avoiding head crash is not known with certainty. However, it is believed that the initially deposited SiC layer serves as a protective corrosion barrier preventing the migration of ions, such as Co and Ni, and also enables the formation of a protective carbon-containing layer having a uniform thickness without discontinuities or voids, thereby providing excellent tribological properties at a very low glide height, e.g., less than about 1 $\mu$inch with long term durability.

An embodiment of the present invention is schematically illustrated in FIG. 1 and comprises a non-magnetic substrate 10, such as a glass, ceramic or glass-ceramic substrate, or a substrate containing an electrolessly deposited or sputtered NiP layer, or a glass substrate containing a Ni plating thereon, an underlayer 11, such as a chromium (Cr) or Cr alloy underlayer, a magnetic layer 12, such as a cobalt (Co) cobalt-alloy layer, the SiC corrosion barrier layer 13, the carbon-containing protective layer 14 and a lubricant topcoat 15. Although not illustrated for convenience, layers 11, 12, 13, 14 and 15 are sequentially deposited on both sides of substrate 10.

Figure 2:
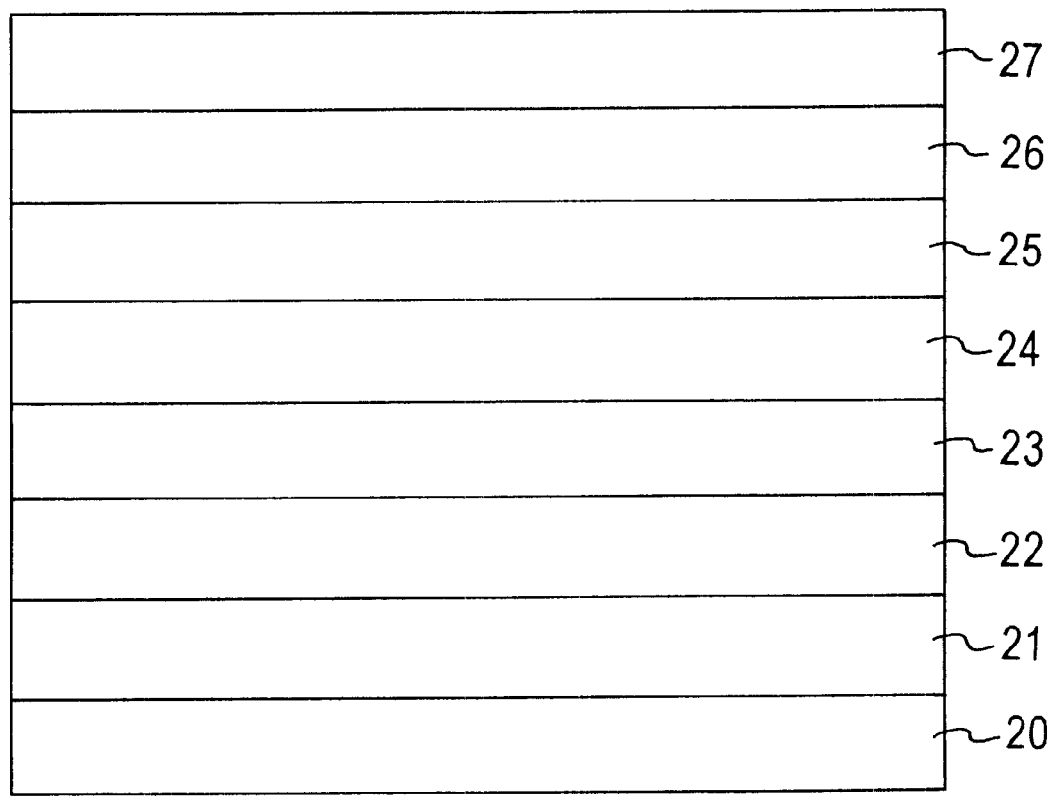
FIG. 2 schematically illustrates a magnetic recording medium in accordance with another embodiment of the present invention.

Another embodiment of the present invention is schematically illustrated in FIG. 2 and comprises non-magnetic substrate 20, a seedlayer, such as nickel aluminum (NiAl) or oxidized NiAl, at a thickness of about 50 Å to about 1,000 Å, an underlayer 22, such as Cr or a Cr alloy, at a thickness of about 10 Å to about 150 Å, an intermediate layer 23, having a thickness of about 10 Å to about 150 Å and comprising Cr or an alloy of Cr, magnetic layer 24 at a thickness of about 50 Å to about 200 Å, SiC corrosion barrier layer 25 having a thickness of about 1 Å to about 40 Å, carbon-containing protective overcoat 26 having a thickness of about 10 Å to about 60 Å and lubricant top coat 27 having a thickness of about 10 Å to about 20 Å. Although not illustrative for convenience, layers 21, 22, 23, 24, 25, 26 and 27 are sequentially deposited on the opposite side of non-magnetic substrate 20.

Figure 3:
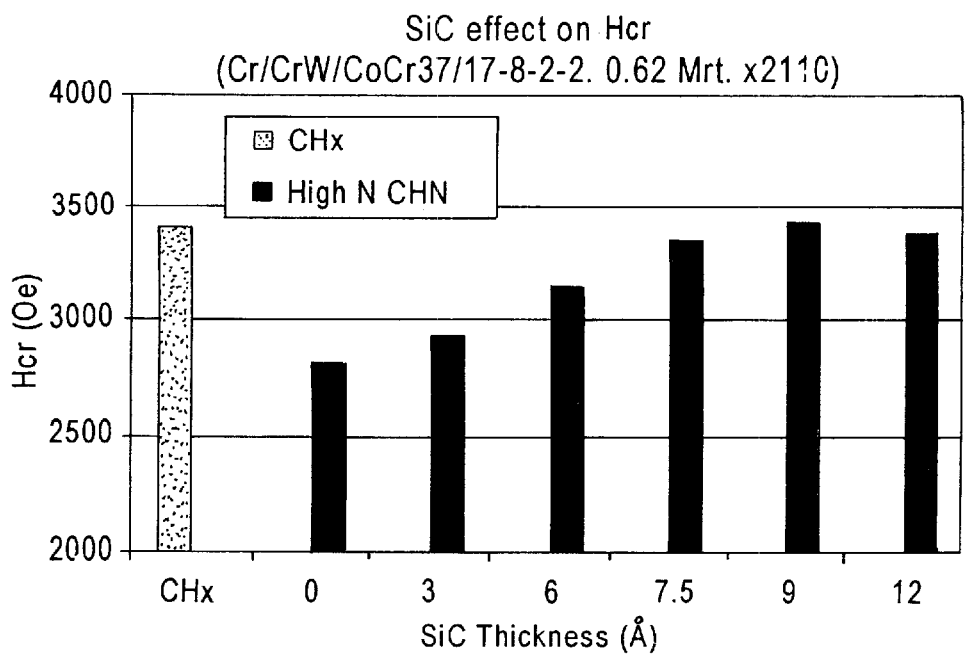
FIG. 3 is a graph showing the relationship between the thickness of a SiC corrosion barrier layer and coercivity.
Figure 4:
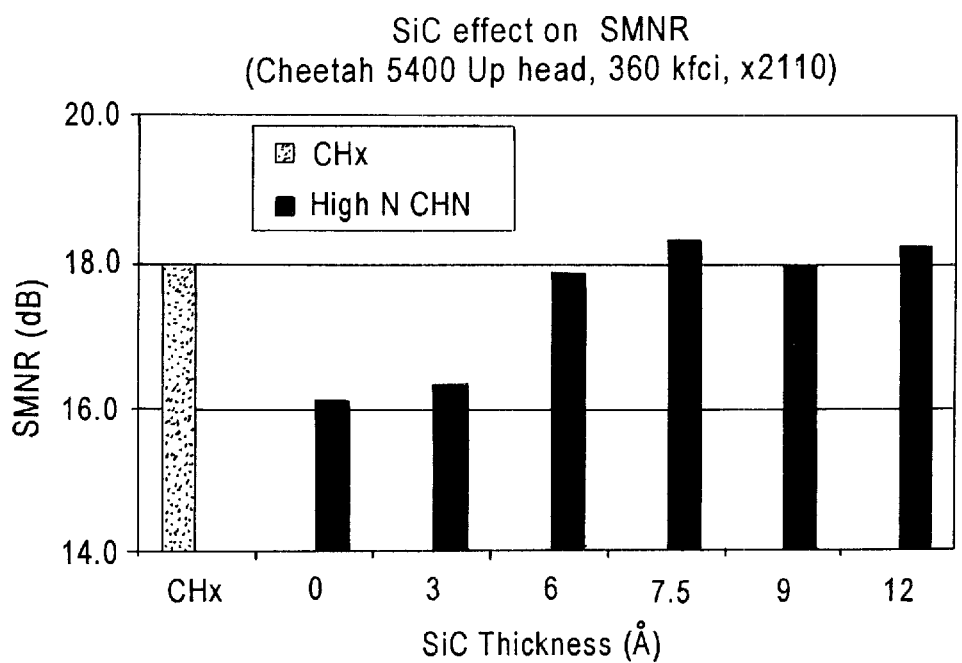
FIG. 4 is a graph showing the relationship between the thickness of the SiC corrosion barrier layer and signal to medium noise ratio (SMNR).

Testing was conducted to illustrate the affect of the thickness of SiC corrosion barrier layer on performance properties such as corecivity (Hcr) and SMNR). The results are reporting in FIGS. 3 and 4. Adverting to FIG. 3, it should be apparent that the corrosion protective SiC barrier layer has the ability at a thickness of 9 Å to achieve a coercivity similar to the level achieved employing a hydrogenated carbon protective overcoat. At the same time, adverting to FIG. 4, a SiC corrosion barrier layer at a thickness of 8 Å increased the SMNR from 16 dB to 18 dB vis-à-vis a high nitrogen containing hydrogenated carbon overcoat.

Figure 5:
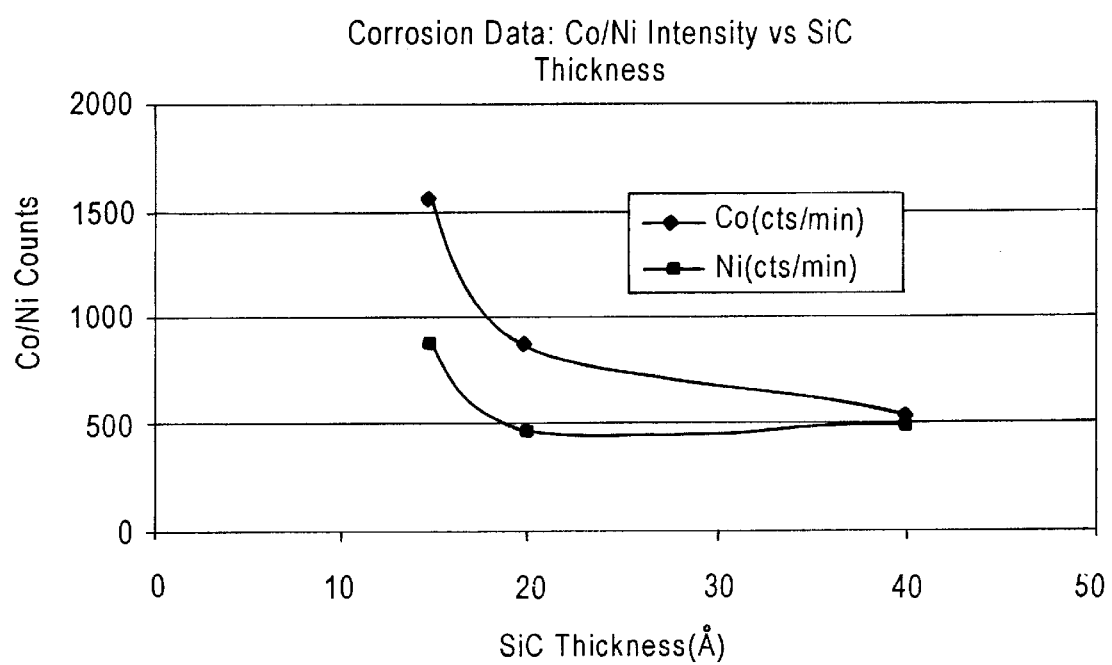
FIG. 5 is a graph showing the effectiveness of a SiC corrosion barrier layer in preventing migration of Co and Ni.

Further testing was conducted to illustrate the corrosion protection ability of a SiC corrosion barrier layer having a thickness in the range of about 10 Å to about 40 Å. The results are reported in FIG. 5. It should be apparent from FIG. 5 that the SiC corrosion barrier layer of the present invention improves corrosion resistance as evidenced by a significantly reduced Co and Ni counts at a SiC thickness of about 20 Å to about 40 Å.

Further tribological testing is reported in Table 1 below, wherein the cycles for the contact-start-stop (CSS) were conducted under several conditions. No crash occurred for 33/80, 55/15 and 75/5 conditions.

cantly less than about 100 Å, such as less than about 75 Å, e.g., less than about 50 Å, for MR and MRG recording without encountering head crash, by providing a SiC corrosion barrier layer between a magnetic layer and a protective carbon layer. Magnetic recording media in accordance with the present invention exhibit superior corrosion resistance and excellent tribological properties at very low glide heights, e.g., less than about 1 μinch, good corrosion resistance and long term durability.

The present invention enjoys industrial utility in manufacturing any of various types of magnetic recording media, including thin film disks. The present invention is particularly applicable in producing high areal recording density magnetic recording media requiring a, low flying height.

Only the preferred embodiment of the present invention and but a few examples of its versatility are shown and described in the present disclosure. It is to be understood that the present invention is capable of use in various other combinations and environments and is capable of changes or modifications within the scope of the inventive concept as expressed herein.

TABLE I

| | Thickness | | | CSS Crash Rate | | | | | |
|---|---|---|---|---|---|---|---|---|---|
| | Sputter | | | | | | | | |
| Cell # | SiC | Carbon | Total | 33/80 | Cycles | 55/15 | Cycles | 75.5 | Cycles |
| 1 | 15 | 50 | 65 | 0% | 7.5 k | 0% | 20 k | 0% | 10 k |
| 2 | 20 | 45 | 65 | 0% | 7.5 k | 0% | 20 k | 0% | 10 k |
| 3 | 40 | 25 | 65 | 0% | 7.5 k | 0% | 20 k | 0% | 10 k |

In fabricating magnetic recording media in accordance with embodiments of the present invention it was found particularly advantageous to sputter deposited the SiC corrosion barrier layer by D.C.-magnetron sputtering thereby providing superior surface coverage and hardness for corrosion, smear and wear protection, while the overlying carbon-containing protective overcoat is deposited by an A.C. or R.F. magnetron sputtering and provides a more friendly interface to reduce pad-slider wear of the recording head. It was found particularly advantageous to provide a composite protective overcoat system having a combined thickness less than about 100 Å, wherein the thickness of the SiC corrosion barrier layer is about 20% to about 40% of the combined thickness, and the carbon-containing protective overcoat is about 60% to about 80% of the combined thickness. The SiC corrosion barrier layer and carbon-containing protective layer can be deposited with the compositions set forth in Table II below.

TABLE II

| Method | Gas Type | H % (TOF-SIMS) | N % (TOF-SIMS) |
|---|---|---|---|
| Carbon-containing protective layer | Ar | — | — |
| | Ar—N | 10%~20% | 2%~15% |
| | Ar—H | 10%~20% | — |
| | Ar—H—N | 5%~20% | 2%~10% |
| SiC layer | Ar | — | — |
| | Ar—H | 20%~30% | — |

The present invention provides magnetic recording media having a protective overcoat system at a thickness signifi-

What is claimed is:

1. A magnetic recording medium comprising:
   a non-magnetic substrate;
   a magnetic layer over the substrate;
   a corrosion barrier layer of silicon carbide (SiC), having a thickness of about 10 Å to about 40 Å, over the magnetic layer;
   a continuous, sputter deposited protective carbon-containing overcoat on the SiC layer; and
   a lubricant layer on the protective carbon-containing overcoat.

2. The magnetic recording medium according to claim 1, wherein the SiC corrosion barrier layer and the protective carbon-containing overcoat have a combined thickness less than about 100 Å.

3. The magnetic recording medium according to claim 2, wherein the combined thickness is less than about 75 Å.

4. The magnetic recording medium according to claim 3, wherein the combined thickness is less than about 50 Å.

5. The magnetic recording medium according to claim 2, wherein:
   the SiC corrosion barrier layer has a thickness of about 20% to about 40% of the combined thickness; and
   the carbon-containing protective overcoat has a thickness of about 60% to about 80% of the combined thickness.

6. The magnetic recording medium according to claim 2, further comprising an underlayer, with the magnetic layer over the underlayer.

7. The magnetic recording medium according to claim 6, further comprising:

a seedlayer, wherein the underlayer is on the seedlayer; and an intermediate layer on the underlayer, wherein the magnetic layer is on the intermediate layer.

8. The magnetic recording medium according to claim 2, wherein the protective carbon-containing overcoat comprises amorphous hydrogenated carbon, amorphous nitrogenated carbon or amorphous hydrogen-nitrogenated carbon.

9. The magnetic recording medium according to claim 1, wherein the non-magnetic substrate is nonconductive.

10. The magnetic recording medium according to claim 9, wherein the non-magnetic substrate comprises glass.

11. The magnetic recording medium according to claim 1, wherein the non-magnetic substrate comprises nickel-phosphorous plated aluminum or an aluminum alloy, or nickel-plated glass.

12. The magnetic recording medium according to claim 1, wherein the SiC corrosion barrier layer is directly on the magnetic layer.

13. The magnetic recording medium according to claim 1, wherein an interface exists between the SiC corrosion barrier layer and the protective carbon-containing overcoat.

14. A method of manufacturing a magnetic recording medium, the method comprising:

depositing a magnetic layer over a non-magnetic substrate;

sputtering depositing a corrosion barrier layer of silicon carbide (SiC), having a thickness of about 10 Å to about 40 Å, over the magnetic layer;

sputtering depositing, a continuous protective carbon-containing overcoat on the SiC layer; and depositing a lubricant layer on the protective carbon-containing overcoat.

15. The method according to claim 14, wherein the SiC corrosion barrier layer and the protective carbon-containing overcoat have a combined thickness less than about 100 Å.

16. The method according to claim 15, wherein the combined thickness is less than about 75 Å.

17. The method according to claim 16, wherein the combined thickness is less than about 50 Å.

18. The method according to claim 15, comprising:

sputter depositing the SiC corrosion barrier layer by D.C. magnetron sputtering; and sputter depositing the protective carbon containing overcoat by A.C. sputtering or by R.F. sputtering.

19. The method according to claim 15, wherein:

the SiC corrosion barrier layer has a thickness of about 20% to about 40% of the combined thickness; and the carbon-containing protective overcoat has a thickness of about 60% to about 80% of the combined thickness.

20. The method according to claim 15, comprising sputter depositing a carbon-protective overcoat of amorphous hydrogenated carbon, amorphous nitrogenated carbon or amorphous hydrogen-nitrogenated carbon.

* * * * *